July 24, 1962
A. W. REYNOLDS
3,046,031
BEACH DRAG
Filed Feb. 25, 1960
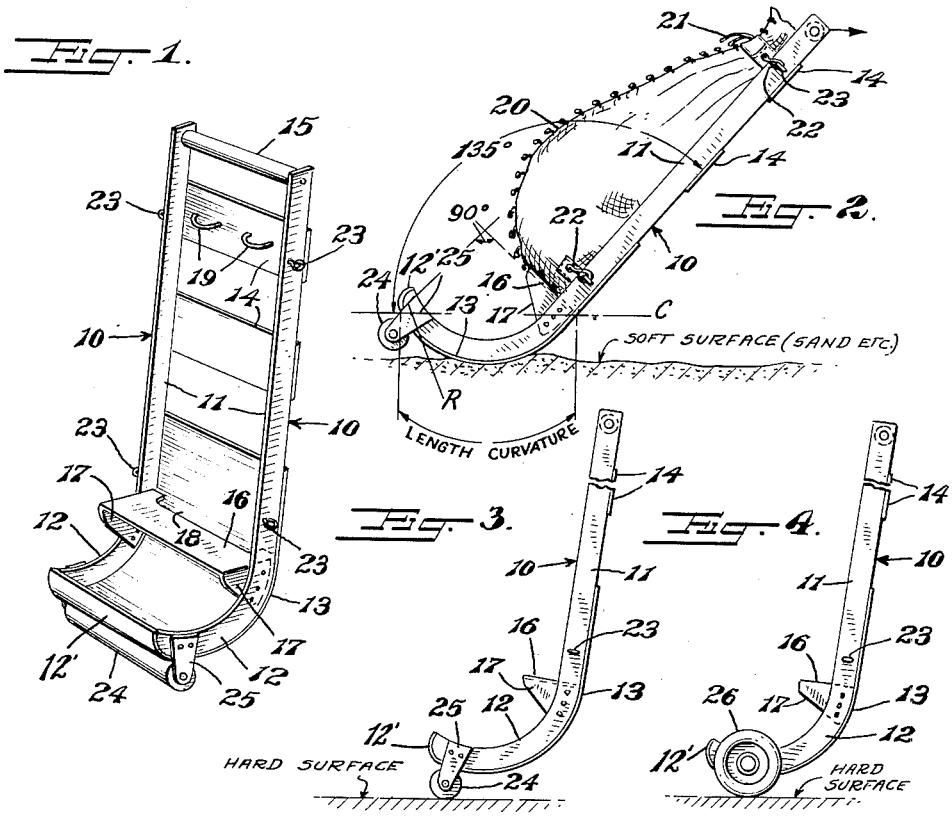
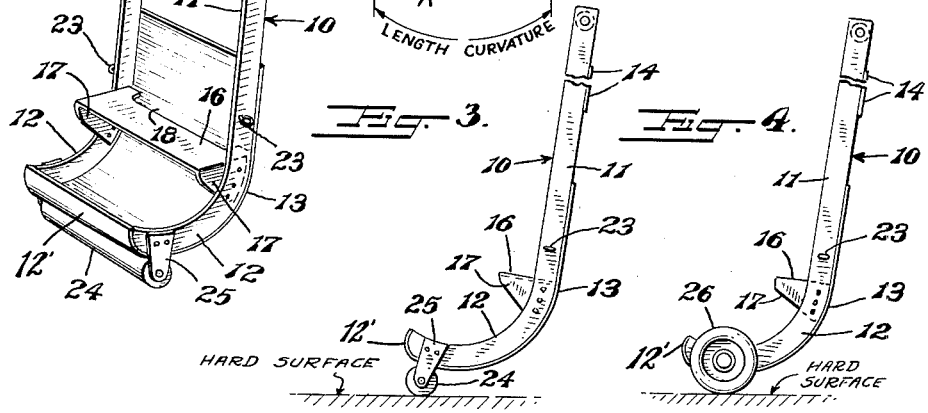
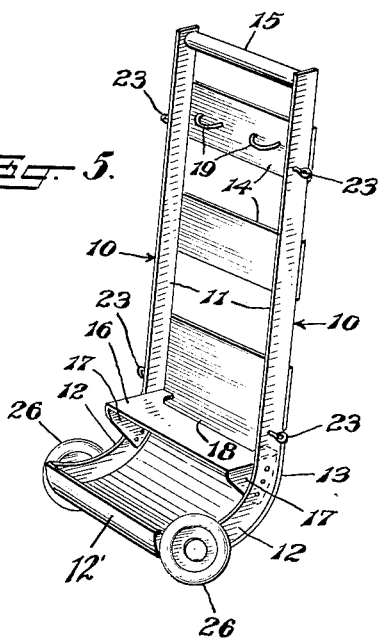
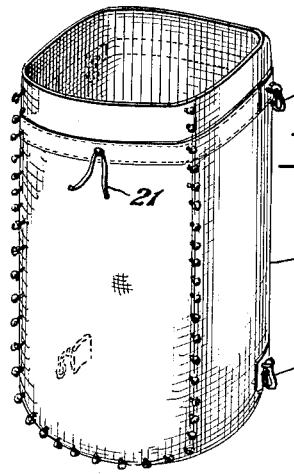
INVENTOR.
ADELE W. REYNOLDS.
BY
Howard P. King
ATTORNEY.

3,046,031
BEACH DRAG
Adele W. Reynolds, 52 Cloverdale Circle,
New Shrewsbury, N.J.
Filed Feb. 25, 1960, Ser. No. 10,958
7 Claims. (Cl. 280—8)

This invention relates to drags, and more especially to that type of drag which may be descriptively designated a beach tote.

In its broad aspect, the invention proposes a drag adapted for transportation of accessories and paraphernalia a person or group of persons may desire at a selected location on a beach.

Also broadly considered, the invention contemplates a drag by which both bulky and heavy loads of conglomerate articles may be readily and safely transported over soft sand and other surfaces with minimum effort either from support of the load or in drawing it across yielding sand.

More specifically, the invention provides a drag having a curved surface of a character that will tend to climb upwardly forward on a soft surface as the drag is pulled forwardly with a limited surface contact in forward direction of movement and at the same time provide transverse surface engagement substantially the width of the drag both for maintaining equilibrium and stability of the drag as it is pulled along the sand and to establish by its movement a coextensive width of evenly disposed path of supporting sand.

A further object is to provide a drag which will be equally effective and as readily used by short or tall persons such as children or adults.

A further object of the invention is to assure location of the center of gravity of the load at a point of equilibrium between the supporting area and the hand-grip for the drag.

Another object of the invention is to provide for appropriate reception and retention of the load.

Yet another object of the invention is to make provision for movement of the drag when necessary over hard or unyielding surfaces and without disagreeable scratching sound of the drag thereon.

The invention purposely provides a construction utilizing an approximately cylindrical segment of sand-engaging supporting area substantially a quadrant in extent with a maximum chordal span at a greater angle than 90° to the back-rest or upwardly projecting portion of the drag.

Furthermore the invention provides a construction wherein the radius of curvature of said cylindrical segment sand-engaging supporting area is greater than a quarter of the length of the back-rest or upwardly projecting portion of the drag.

Still other objects, advantages and beneficial structural features of the invention will become apparent to persons skilled in the art to which the invention appertains as the description proceeds, both by direct recitation thereof and by implication from the context.

Referring to the accompanying drawing, in which like numerals of reference indicate similar parts throughout the several views;

FIGURE 1 is a perspective view of one embodiment of my invention;

FIGURE 2 is a side elevation of the drag of my invention showing a load applied thereto and showing the drag in use on soft sand;

FIGURE 3 is a side elevation of the drag of FIGS. 1 and 2, showing it in position of use on a hard surface;

FIGURE 4 is a side elevation of a modified construction of drag using wheels instead of a roller;

FIGURE 5 is a perspective view of the modified construction of FIG. 4; and

FIGURE 6 is a perspective view of a load-carrying flexible container in open or extended condition.

In the specific embodiment of the invention illustrated in said drawing, the drag is shown as providing correspondingly shaped side pieces 10, 10 of elongated character arranged in parallel planes spaced from each other a desirable distance for provision of appropriate width for the drag. Each side piece has an upper substantially straight elongated body portion 11 and at its lower end, in its respective plane, has a curved foot portion 12 which protrudes in what may be herein termed a rearward direction from the said straight body portion in such a manner that the toe end of the foot portion is directed rearwardly and is projecting in a direction substantially perpendicular thereat to the general direction of said body portion. The curvature of said foot portion 12 is preferably a comparatively wide arc beginning tangentially from the bottom of the straight portion 11 and is substantially a quadrant in extent. The toe end 12' of the foot portion therefore extends at least far enough to intercept a radius R of the curvature which is parallel to the general direction of the straight portion. A chordal line C from one end of the curvature to the other end thereof makes an angle to said straight portion of more than 90° and less than 180° and more nearly in the vicinity of 135°. The radius of curvature is preferably chosen to afford a very material projection of the toe end of the foot portion from the general direction of the straight portion, and as shown, the length of the straight portion is agreeably four to five times the length of said radius of curvature. Furthermore, to assure stability in use, the spacing of the side pieces 10, 10 from each other should be at least as great as the length of the radius of curvature of the foot portion.

Spanning the space from one side piece 10 to the other, beginning at the toe ends of the foot portions 12 at the under edges thereof, and being at least coextensive with the foot portions and preferably also extending a distance up the body portions 11, is a shoe or skid 13 providing a smooth continuous or unbroken surface. As here shown, said skid extends upwardly along the straight body portion of the side pieces a distance at least as great as the length of the radius of curvature of the curved part of said skid. The skid is fixed with respect to said side pieces and will have one function of bracing the side pieces and maintaining them in parallelism. Conversely, the side pieces establish and maintain the curvature and rigidity of the skid.

According to the present showing, the skid 13 extends only part of the way up the straight portion of the side pieces, but the invention is not limited to termination of the skid to the precise distance up the straight portions illustrated, as it is within the province of the manufacturer to bring the skid as far up the side pieces as desired. But in such instances as herein shown wherein the upper termination edge of the skid is at a distance above the curvature of the foot portion which is only part way of the length of the straight portions 11 of the side pieces, it is desirable to provide suitable fencing thereabove to constitute additional back rest for the load to be carried by the drag. Illustrative of such fencing, I have shown a couple of cross panels 14 at appropriate intervals above and parallel to the upper edge of the skid, and it will be understood that said panels are suitably fixed in place at the desired locations on the edges of the side pieces.

A hand-grip 15 extends across from one side piece to the other proximate to the upper ends thereof, said hand-grip being fixed at its ends to said side pieces so that a user may grasp it anywhere from side to side of the drag and support the upper end of the drag where best suited to maintain equilibrium of the load and drag while pulling the drag in the direction of the arrow shown in FIG. 2. Consequently it is not imperative to distribute the load carefully to centralize the center of gravity of the load between the side pieces as the user can compensate for an uneven distribution of load by shifting his or her hand appropriately along the handle. Said handle or hand-grip also serves the purpose of bracing the side pieces and adding rigidity and strength to the assembly, augmenting the bracing and rigidity provided by the skid 13 and fencing 14 above described.

A shelf 16 is preferably provided between the side pieces for support of the load, and is shown in this instance as projecting rearwardly from the straight portions 11 of the side pieces and straight portion of the skid 13 perpendicular thereto and at a location substantially at the junction of said straight and curved portions. As a convenient construction, said shelf may be supported by bracket 17 at its ends depending therefrom and riveted or otherwise secured to the side pieces. If desired, the shelf may be shaped and/or appropriately located so as to provide a slot 18 between the shelf and skid. Such slot will serve as a convenient receptacle for the lower ends of elongated objects, such as tent or umbrella poles or the like, and for additional retention of such objects, elastic or other straps or loops 19 may be provided near the top of the drag, for instance, on the uppermost cross panel 14.

A commodious bag or pouch 20 is provided with the drag for retaining the usual conglomeration of paraphernalia or items desired to be transported to a desired location on a beach. Aa draw-string 21 may be incorporated proximate to the open end of such bag for temporary closing purposes. Appropriate means likewise will be provided to retain the bag on the drag, and for illustrative purposes snap hooks 22 are shown mounted on the bag in proper location to be applied to eyelets or the like 23 disposed on the outer faces of the side pieces 10.

It is within the realm of possible use of the drag for the bag to be applied thereto in empty state and then loaded in a person's place of dwelling, after which it can be placed in a car intact with the load for travel to convenient parking distance to the beach. The loaded drag may be lifted from the car and by grasping hand-grip 15 may then be dragged to the selected place on the beach. The elongated straight portion of the drag has adequate length so that it will slope from the person's hand, as normally held, downwardly toward the sand or other surface at approximately 45° and only a limited arcuate part of the curved foot portion of the skid will make supporting and sliding contact with the sand. While the drag is being pulled, it will tend to ride upwardly over impeding mounds of sand and will sink only very slightly in soft sand due both to the area of the skid engaging the sand and the compacting effect of the skid riding upwardly out of the slight semblance of hollow it makes in the sand. By virtue of that compacting effect, together with the angle of pull on the drag and the comparatively large radius of curvature, the drag will be found to pull very easily.

There may be occasions when it is necessry or desirable to move the drag over a hard surface, such as a floor, porch, walk, roadway, pier or the like and to do so with the skid in contact with the surface might create an objectionable scratching noise or be otherwise undesirable. In view thereof, I deem it advisable to provide rotary ground-contacting means for alternative use in such instances. As an example of such means, FIGS. 1 to 3 illustrate a roller 24 extending across the drag at the toe end thereof and trunnioned in depending cleats 25 secured to the side pieces 10. Location of the roller 24 is such that it will not normally contact the ground, but will only do so when the drag is held in a nearly upright position, namely within the range of an angle of 60° to 90° to the ground surface. If preferred, wheels 26 may be trunnioned at the outsides of the toe portions of the side pieces as shown in FIGS. 4 and 5 to function as the ground-contacting rotary means, and if so used, would likewise normally contact the ground only when the drag is in a correspondingly nearly upright position.

Finally, it should be noted that the drag has a construction conducive to readily moving the same up and down stairs or over curbs and the like by virtue of the extended sliding surface provided by the unified curved and straight portions of the skid which is adequately extensive for engagement with such obstructions to ride over the same at all angles of slope to which the drag is subjected in being pulled in use. No matter how short or tall the person may be that is pulling the drag, it will always be the curved part of the skid that engages the sand, and such engagement will not exceed half of the length of the curvature.

I claim:

1. A drag adapted for use as a beach tote, comprising an elongated straight portion and a curved skid portion at the lower end of said straight portion, a shelf projecting over said curved skid portion from the junction of the curved skid portion with said straight portion, and a bag for receiving a load to be transported by said drag, said drag and bag having means for releasably retaining the bag on said shelf and on said straight portion, and means for receiving and retaining elongated articles longitudinally of said straight portion between said bag and skid portion.

2. A drag adapted for use as a beach tote, comprising an elongated straight portion having top, bottom and sides, and a curved skid portion, said skid portion being at the bottom of the straight portion and extending from side to side thereof and engageable with a ground surface with the straight portion sloped at an angle of approximately 45°, and auxiliary rotary ground-engaging means raised from ground engagement while said straight portion is at an angle up to approximately said 45° of slope, said ground-engaging rotary means making contact with the ground on approach of slope of said straight portion more closely to a 90° angle to ground.

3. A drag adapted for use as a beach tote, comprising an elongated body having a hand grip at its upper end, and a skid the entire under area whereof is a continuous evenly smooth surface extending from side to side of and at the lower end of said body and at the under side of said body, said skid having a curved area the axis whereof extends crosswise of the body and wherein the chordal plane across the ends of said curved area is transverse to said body and substantially in parallelism to the ground when the body is held by said hand grip by a person and the skid pulled, and wherein said chordal plane makes an angle of more than 90° with said elongated body and the length of curvature of the skid is greater than the radius of curvature thereof.

4. A drag in accordance with claim 3, wherein said chordal plane across the ends of said curved area makes an angle of substantially 135° with said elongated body.

5. A drag adapted for use as a beach tote, comprising a pair of spaced side pieces having elongated straight portions parallel to each other and having curved foot portions, said foot portions having toe ends remote from said straight portions with the toe ends at least projecting to and substantially terminating at a radius of curvature of said foot portions that extends in a direction parallel to said straight portion, and a skid spanning across from one foot portion to the other at the under sides thereof and fixed thereto and having a like curvature as said foot portions with the length of curvature of said skid at least coextensive with the length of said curved foot portions, the chordal plane across the ends of said curvature of said foot portion of the skid being substantially in parallelism to the ground when the drag is held at the upper ends of said straight portions by a person and the skid pulled, said chordal plane having an angle of more than 90° with said straight portions and the length of curvature of the skid being greater than the radius of curvature thereof, said skid providing a single ground-engaging under surface below said foot portions throughout the entire area of said under surface of said skid from one side of the drag to the other.

6. A drag adapted for use as a beach tote, comprising a pair of spaced side pieces having elongated straight portions parallel to each other and having curved foot portions, said foot portions having toe ends remote from said straight portions with the toe ends at least projecting to and substantially terminating at a radius of curvature of said foot portions that extends in a direction parallel to said straight portions, and a skid spanning across from one foot portion to the other at the under side thereof and fixed thereto and having a like curvature as the foot portions and having a length of curvature at least as long as said foot portions, said skid providing a single smooth ground-engaging under surface below said foot portions throughout the entire area of said under surface of said skid from one side of the body to the other, said skid having a straight planar portion extending from the curved portion thereof with continuity of single smooth under surface therewith and extending at least part of the way toward the top of the drag and fixed to said straight portions of the side pieces, the chordal plane across the ends of said curved portion of the skid being substantially in parallelism to the ground when the drag is held at its upper end by a person and the skid pulled, said chordal plane making an angle of more than 90° with said straight portion and the length of curvature being greater than the radius of curvature of said curved portion.

7. A drag adapted for use as a beach tote, comprising an elongated straight portion including sides and cross members, and a skid having a planar portion at the lower part of said straight portion spanning between said sides, said skid having a single smooth curved portion from side to side of the drag in continuation of said planar portion and extending downwardly therefrom, and a shelf in a plane substantially perpendicular to said straight portion and projecting over said curved skid portion from the junction of the curved skid portion with said straight portion, said shelf providing space medially between the ends of the shelf and between the shelf and said skid for receiving therein lower ends of elongated articles resting against said cross members, said curved portion of said skid underlying said space progressively at increasing distance below the shelf and in a direction toward the front of the shelf whereby articles will become wedgingly retained between said shelf and skid.

References Cited in the file of this patent
UNITED STATES PATENTS

| | | |
|---|---|---|
| 531,937 | Herman | Jan. 1, 1895 |
| 1,139,636 | Calhoun | May 18, 1915 |
| 1,276,322 | Bullock | Aug. 20, 1918 |
| 2,433,246 | Stelzer | Dec. 23, 1947 |
| 2,438,596 | Arave | Mar. 30, 1948 |
| 2,531,520 | Lankford | Nov. 28, 1950 |
| 2,551,040 | Newell | May 1, 1951 |
| 2,829,902 | Stocker | Apr. 8, 1958 |

FOREIGN PATENTS

| | | |
|---|---|---|
| 619,827 | France | Jan. 6, 1927 |
| 972,486 | France | Aug. 30, 1950 |